US011980588B2

(12) United States Patent
Zijlstra et al.

(10) Patent No.: US 11,980,588 B2
(45) Date of Patent: May 14, 2024

(54) BABY FEEDING BOTTLE

(71) Applicant: KONINKLIJKE PHILIPS N.V., Eindhoven (NL)

(72) Inventors: Aaldert Geert Zijlstra, Zuidlaren (NL); Klaas Kooijker, Drachten (NL); Gertrude Riëtte Bakker-Van Der Kamp, Den Helder (NL); Johannes Tseard Van Der Kooi, Munein (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 189 days.

(21) Appl. No.: 17/297,541

(22) PCT Filed: Dec. 27, 2019

(86) PCT No.: PCT/EP2019/087080
§ 371 (c)(1),
(2) Date: May 27, 2021

(87) PCT Pub. No.: WO2020/141149
PCT Pub. Date: Jul. 9, 2020

(65) Prior Publication Data

US 2022/0040045 A1 Feb. 10, 2022

(30) Foreign Application Priority Data

Jan. 2, 2019 (EP) .................................... 19150081

(51) Int. Cl.
*A61J 11/00* (2006.01)
*A61J 9/04* (2006.01)
(Continued)

(52) U.S. Cl.
CPC ............... *A61J 11/002* (2013.01); *A61J 9/04* (2013.01); *A61J 11/02* (2013.01); *A61J 11/04* (2013.01)

(58) Field of Classification Search
CPC ... A61J 11/002; A61J 9/04; A61J 11/02; A61J 11/04
(Continued)

(56) References Cited

U.S. PATENT DOCUMENTS 2,764,155 A * 9/1956 Meyers .................. A61J 11/002 215/11.4
4,940,152 A * 7/1990 Lin ........................... A61J 9/00 215/11.1
2007/0163983 A1 * 7/2007 Hsu ........................ A61J 11/002 215/11.4

FOREIGN PATENT DOCUMENTS

CN 201227421 Y 4/2009
WO 2018/162366 A1 9/2018

OTHER PUBLICATIONS

International Search Report and Written Opinion dated Feb. 21, 2020 For International Application No. PCT/EP2019/087080 filed Dec. 27, 2019.

* cited by examiner

*Primary Examiner* — Don M Anderson
*Assistant Examiner* — Jessica Kavini Tamil

(57) ABSTRACT

A baby bottle device (100) is provided which comprises a teat (110) having a teat volume (115), a container (120) having a container volume (125) and a partitioning element (300) between the teat volume (110) and the container volume (125). The partitioning element (300) comprises a plurality of openings (310) for letting fluid in the container volume (125) flow into the teat volume (115). The baby bottle device comprises a floater (400) having a buoyancy, being coupled to the partitioning element (300) and being adapted to close at least one of the plurality of openings (310) in the partitioning element (300).

17 Claims, 3 Drawing Sheets

(51) Int. Cl.
*A61J 11/02* (2006.01)
*A61J 11/04* (2006.01)

(58) Field of Classification Search
USPC .......................................................... 215/11.5
See application file for complete search history.

BABY FEEDING BOTTLE

FIELD OF THE INVENTION

The invention relates to a baby feeding bottle.

BACKGROUND OF THE INVENTION

During the baby feeding with a bottle, the baby may swallow air together with the milk from the bottle. This can result in colic. A colic is a condition some infants suffer from during early months and is caused by air in the digestive system. Air ingestion is unavoidable both in breast feeding and bottle feeding due to the presence of vacuum in the infant's mouth during feeding. It is, however, desired to reduce the amount of air ingestion by the infant to reduce the risk of a colic.

WO 2018/162366 discloses a baby feeding bottle with a container, an adapter and a teat. Furthermore, a partitioning is provided between the teat volume and the volume of the container. The partition allows fluid to flow from the container into the teat and that air inside the teat volume can escape into the container volume in order to reduce the amount of air in the teat volume.

U.S. Pat. No. 2,764,155 discloses a baby bottle having a floating ball in a cage between the bottle and the teat. When the bottle is nearly empty (i.e. there is less milk than fills the teat) the ball sinks to prevent air entering the teat.

US 2007/0163983 discloses a baby bottle having a seal disc in the bottle which closes openings between bottle volume and the teat when the bottle is nearly empty. This again prevents air entering the teat.

There remains a problem that air can enter the teat even when the bottle is not nearly empty. For example, if the bottle is not vertically inverted during use there may be an air volume at an upper side and a milk volume at a lower side, and the air volume may couple to the teat, still allowing air to enter the teat.

SUMMARY OF THE INVENTION

It is an object of the invention to provide a baby feeding bottle with an improved colic prevention capability. It is in particular an object of the invention to provide a baby feeding bottle which can efficiently prevent air flowing into a teat volume.

The invention is defined by the claims.

According to an aspect of the invention, a baby bottle device is provided which comprises a teat having a teat volume, a container having a container volume and a partitioning element between the teat volume and the container volume. The partitioning element comprises a plurality of openings for letting fluid in the container volume flow into the teat volume. The baby bottle device comprises a floater having a buoyancy, being coupled to the partitioning element and being adapted to close at least one of the plurality of openings in the partitioning element. Hence, a baby feeding bottle can be provided which is rotation independent. The baby bottle can used in any rotational orientation.

According to an embodiment, an adapter is provided for coupling the teat and the container.

According to a further embodiment, the floater comprises a hollow chamber filled with air in order to provide the required buoyancy.

According to an embodiment, the floater is adapted to float if liquid is present in an open end of the container such that the floater closes those openings in the partitioning element which are arranged at a top side.

According to a further embodiment, the baby bottle device furthermore comprises a flexible element coupled to the partitioning element and the floater. The flexible element is coupled to the floater and is in loose contact with the partitioning element. Thus, with the flexible element, an improved sealing of the openings can be provided preventing air entering the teat volume. The flexible sheet allows a sealing between the floater and the openings.

According to an embodiment, a valve can be provided to let out air from the teat volume into the container volume. The flexible element can function as a valve. Alternatively, the valve can be a duck-bill valve.

The invention also provides a partitioning system for a baby bottle device comprising the partitioning element and floater of the baby bottle defined above.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
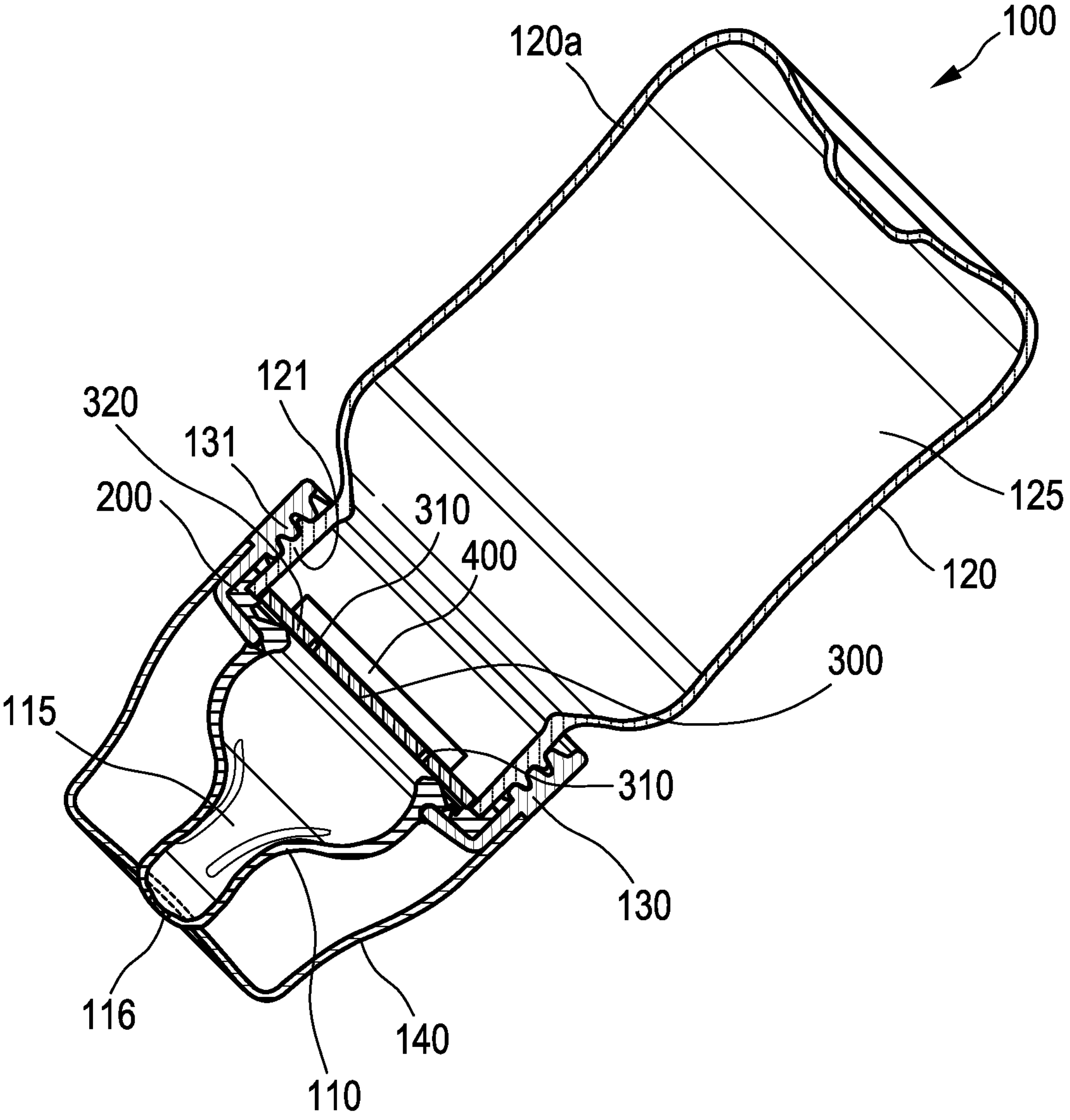
FIG. 1 discloses a schematic representation of a baby bottle device.

FIG. 1 discloses a schematic representation of a baby bottle device. The baby bottle 100 comprises a container 120 with a container wall 120*a*, a teat 110 and optionally an adapter 130 for example in form of an attachment ring to attach the teat 110 to the container 120. The container 120 comprises a thread 121 which can interact with a thread 131 of the adapter 130 such that the teat 110 can be fastened to the container 120. The container 120 comprises a container volume 125 and the teat 110 comprises a tent volume 115. The teat 110 may comprise at least one valve and holes/apertures 116.

Optionally, a valve may be present to let in air into the container volume.

A partitioning element 300 is provided between the teat 110 and the container 120. The partitioning element 300 can have several holes 310 (sometimes referred to herein as openings 310) arranged, for example in a circle to allow liquid to flow from the container into the teat. The partitioning element 300 can have a valve 320 for letting out air from the container volume 125 into the teat volume 115. The valve can be e.g. duck-bill valve.

Figure 2B:
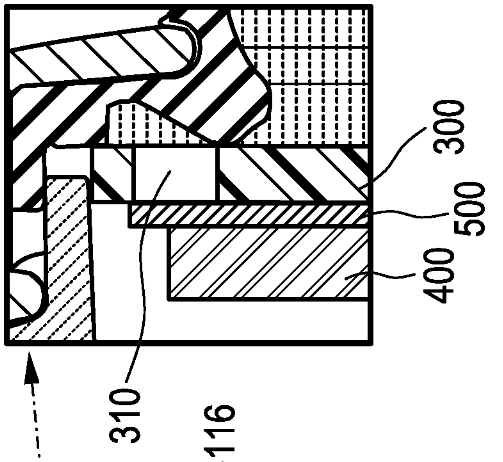
FIG. 2B shows an enlarged portion of the baby bottle according to FIG. 2A.
Figure 2A:
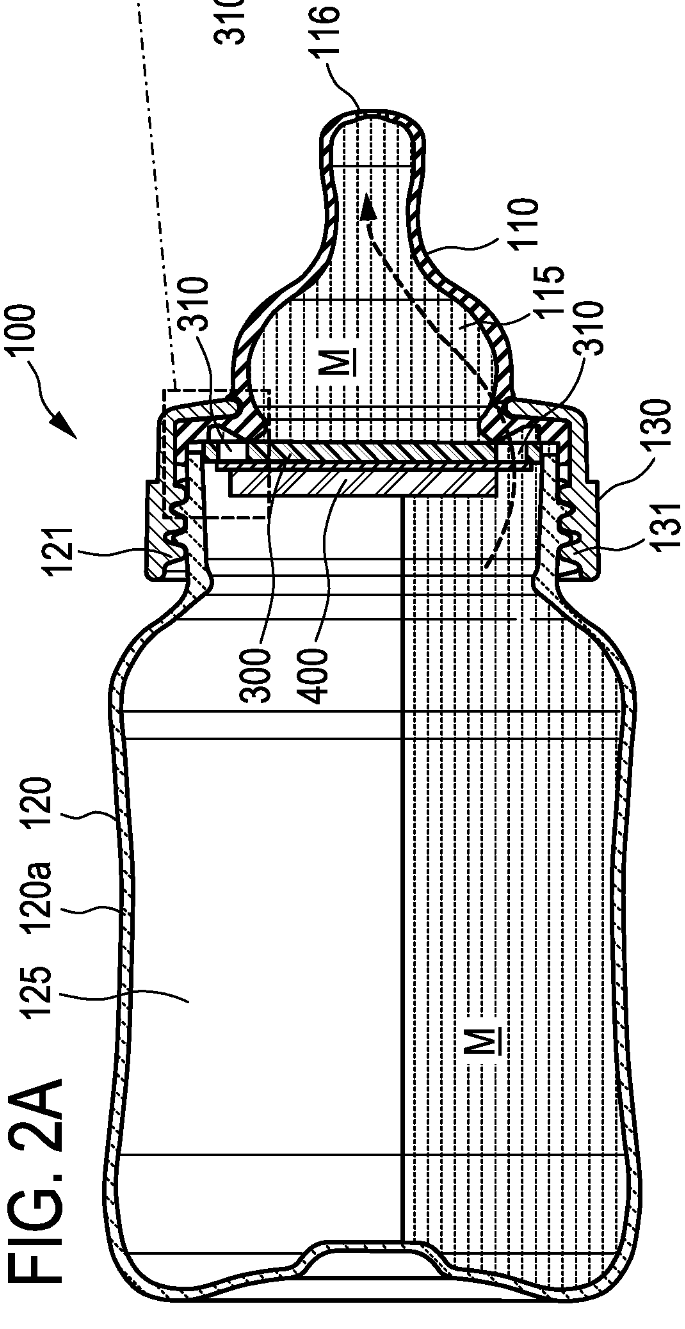
FIG. 2A shows a further schematic cross section of a baby bottle device according to an embodiment.

FIG. 2A shows a further schematic cross section of a baby bottle device according to an embodiment and FIG. 2B shows an enlarged portion of the baby bottle according to FIG. 2A. The baby bottle 100 comprises a container 120, optionally an adapter 130 and a teat 110. The teat 110 can be attached to the container 120 for example by means of the adapter 130. In the transition region between the container 120 and the teat 110, a partitioning element 300 and a floater 400 are provided. The partitioning, element 300 can be adapted in the contour of the open end of the container 120 and is typically circular. The partitioning element 300 can comprise a plurality of holes or openings 310. Preferably, the partitioning element 300 comprises a plurality of holes 310 which are arranged on a circle. Adjacent to the partitioning element 300, a floater 400 can be provided. The floater 400 is arranged adjacent to the partitioning element towards the container 120. The holes 310 are provided to allow milk M inside the container volume 125 to flow into the teat volume 115. Due to the buoyancy of the floater 400, the floater 400 will always tend towards the upper side of the open end of the container 120 and will thus close any holes 310 in the upper end (i.e. at a vertically upper region of the partitioning element). If the baby bottle 100 is rotated, the buoyancy of the floater 400 will enable the floater 400 to close the holes 310 in the partitioning element 300 which are arranged at the top side. Thus, different holes are then at a vertically upper region of the partitioning element. Thus, the floater 400 which is coupled to the partitioning element 300 will always close the uppermost holes in the partitioning element avoiding that air can enter the teat volume 115. Those holes 310 in the partitioning element 300 which are not closed by the floater 400 will allow milk M to flow from the container volume 125 into the teat volume 115. In particular, the partitioning element will open any holes of the partitioning element which are located at a vertically lower region of the partitioning element.

As soon as the bottle is not perfectly vertically inverted, there will be one or more vertically upper openings and one or more vertically lower openings. Thus, vertically upper and vertically lower should be understood to be relative terms. The partitioning element does not need to be vertically positioned in order for vertically upper and vertically lower holes to be present. Any non-horizontal orientation will result in relatively upper and relatively lower regions.

Optionally, a flexible sheet 500 can be provided between the floater 400 and the partitioning element 300. The flexible sheet 500 serves to seal the floater 400 and the partitioning element.

The end of the flexible sheet 500 (sometimes referred to herein as flexible element 500) covering the holes 310 can function as the valve 320 letting out air from the teat volume 115 into the container volume 125. The flexible sheet 500 can be pushed away from the opening 310 such that air can flow from the teat volume to the container volume.

The flexible sheet or flexible element 500 can be attached or coupled to either to the floater 400 or the partitioning element 300. If the flexible element 500 is attached to the partitioning element 300, the flexible sheet may also comprise holes or openings corresponding to the holes and openings of the partitioning element.

The flexible sheet or flexible element 500 may also be connected to the floater 400. In this case, the flexible sheet 500 or the ends of the flexible sheet 500 may act as a valve for letting out air from the teat volume into the container volume.

According to an embodiment, the flexible sheet 500 is optional. This can in particular work if the surfaces of the floater and the partitioning element are sufficiently smooth to enable a closing of holes by the floater.

According to a further embodiment, the flexible sheet may be connected to the floater for example in form of a flexible lip around the circumference of the floater. Accordingly, the flexible sheet may be stationary or can be moved relative to the partitioning element or the floater.

Figure 3:
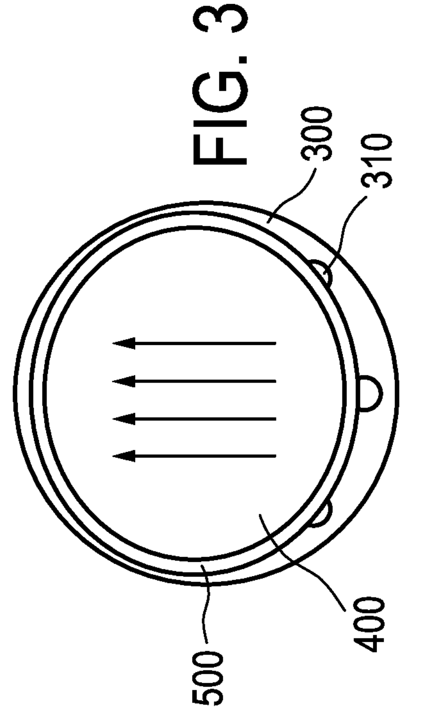
FIG. 3 shows a schematic representation of a partitioning element and a floater according to an embodiment.

FIG. 3 shows a schematic representation of a partitioning element and a floater according to an embodiment. In FIG. 3, the partitioning element 300 with the holes 310, the flexible sheet 500 and the floater 400 is depicted. Because of the buoyancy of the floater, the floater 400 will always float towards the upper side of the container 120.

Figure 4:
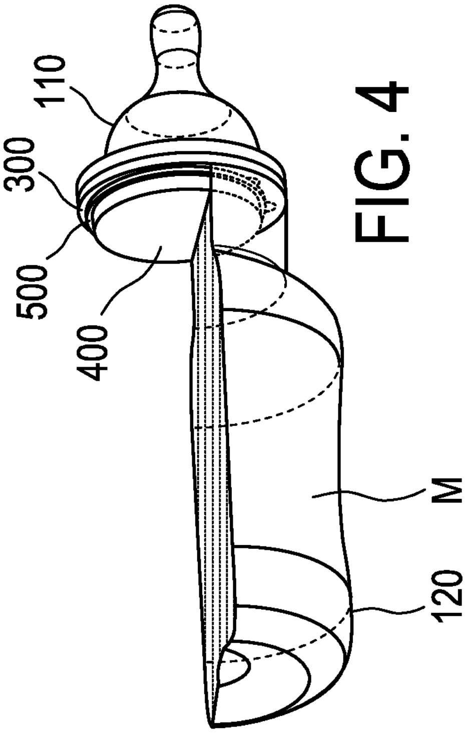
FIG. 4 shows a schematic representation of the baby bottle.

FIG. 4 shows a schematic representation of the baby bottle. In FIG. 4, part of the container 120 and the teat 110 are depicted. Furthermore, the partitioning element 300, the floater 400 and the flexible sheet 500 are depicted.

Figure 5:
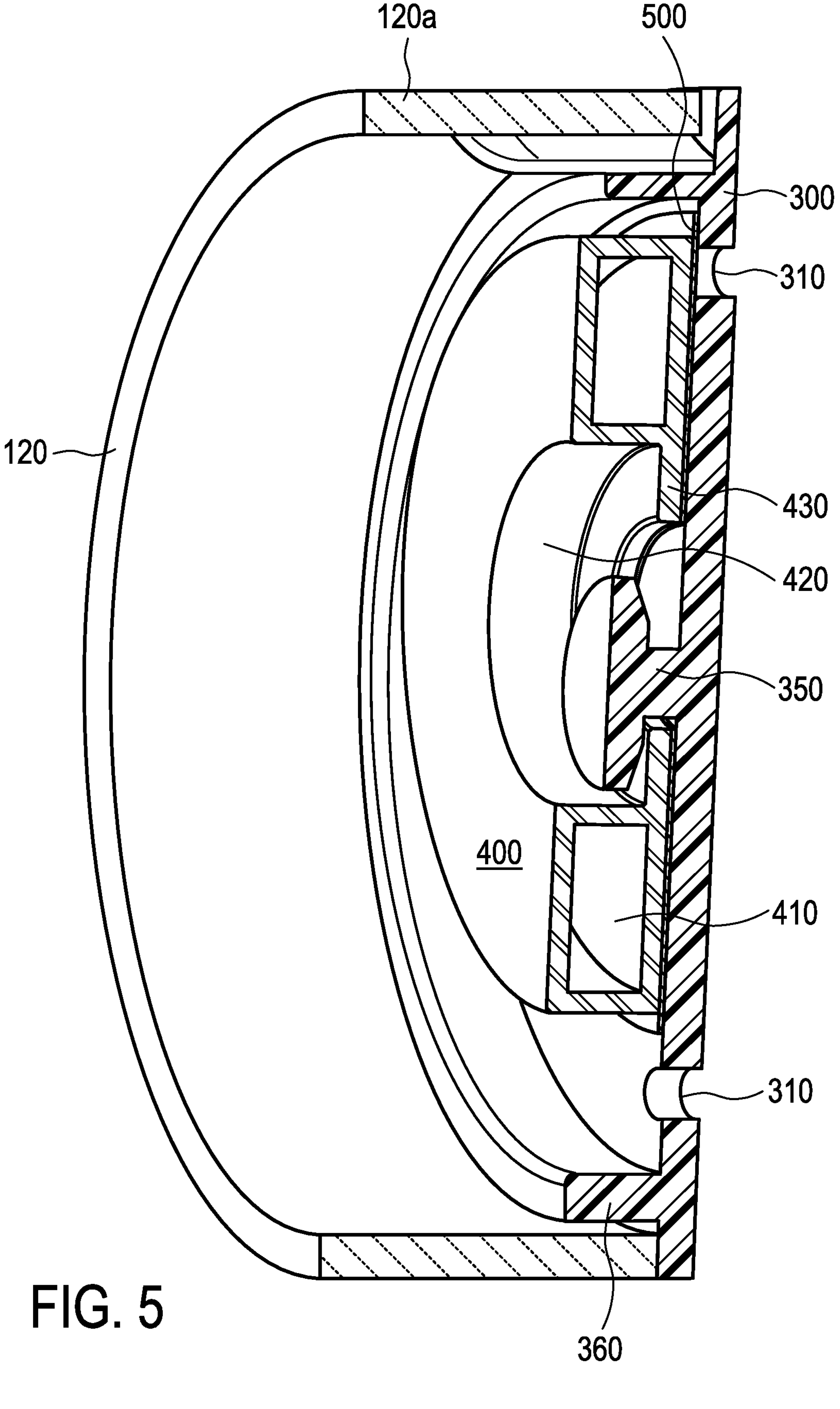
FIG. 5 shows a schematic cross section of part of a baby bottle.

FIG. 5 shows a schematic cross section of part of a baby bottle. In FIG. 5, the partitioning element with the floater are depicted in more detail. The partitioning element 300 comprises at least one hole 310, a circumferentially extending wall 360 and a guiding element 350, which is optionally arranged in the middle of the partitioning element 300. Notably, the guiding element may be referred to herein as guiding pedestal 350. The partitioning element 300 can comprise a plurality of holes 310 or the holes may be implemented as a circular hole. The floater 400 comprises a hollow chamber 410, which is filled with air in order to provide the required buoyancy of the floater. The hollow chamber 410 can be arranged as a circle such that the middle 420 is open. In the region of the middle 420, a nose 430 is provided which can interact with the guiding element 350 in order to hold or guide the floater 400 attached to the partitioning element. The partitioning element 300 will cover the open end of the container 120.

Due to the buoyancy of the floater 400, the flexible sheet 500 can be moved into a position in order to close off and open holes in the partitioning element which can be implemented as a separation wall.

According to an embodiment, the floater 400 and the flexible sheet 500 are able to move with respect to the partitioning element 300 and are adapted to stay in close distance to the partitioning element 300 in order to be able to close off the holes 310 in the partitioning element 340. This is advantageous as the floater 400 and the flexible sheet 500 can block those openings through which air can leak into the teat volume. The flexible sheet 500 can be of e.g. oval or circular shape. The floater 400 is adapted to rotate depending on the orientation of the baby bottle 100 when the teat 110 is filled. The oval shaped flexible sheet 500 can be aligned with the liquid interface to close the holes 310 which are exposed to air inside the container. As the floater 400 closes off those openings 310 through which milk can enter into the teat volume 115, the floater 400 will open other openings through which air can flow into the teat volume 115. Accordingly, the cross section of the floater is smaller than the cross section of the partitioning element. Furthermore, the cross section of the floater is smaller than a circle along which the openings 310 are arranged.

According to an embodiment, the floater 400 is at least partly hollow to create the required buoyancy. Alternatively, the floater can be made from a material which has a lower density than milk to enable it to float on milk. As shown in FIG. 5, the guiding pedestal 350 is provided preferably in the middle of the partitioning element. The guiding pedestal 350 can interact with the floater to enable a maximum freedom of move.

Other variations to the disclosed embodiments can be understood and effected by those skilled in the art in practicing the claimed invention, from a study of the drawings, the disclosure, and the appended claims.

The partitioning element and floater of the baby bottle device described above may be considered to be a partitioning system, and may be provided as a separate replaceable unit.

In the claims, the word “comprising” does not exclude other elements or steps, and the indefinite article “a” or “an” does not exclude a plurality.

A single unit or device may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention claimed is:

1. A baby bottle device, comprising a teat having a teat volume, a container having a container volume, a partitioning element at an open end of the container between the teat volume and the container volume, having a plurality of openings for letting fluid in the container volume flow into the teat volume, and a floater having a buoyancy, and being coupled to the partitioning element, wherein the floater is adapted to float in a liquid in the container volume when liquid is present at the open end of the container, wherein, when floating, the floater is adapted to: close at least one opening of the partitioning element, which is located at a vertically upper region of the partitioning element, due to the buoyancy of the floater causing the floater to float to said vertically upper region of the partitioning element; and, at the same time, open at least one opening of the partitioning element which is located at a vertically lower region of the partitioning element.

2. The baby bottle device according to claim 1, further comprising an adapter for coupling the teat to the container.

3. The baby bottle device according to claim 1, wherein the floater comprises a hollow chamber filled with air in order to provide a required buoyancy or is made of a material which has a lower density than milk to enable it to float on milk.

4. The baby bottle device according to claim 1, further comprising at least one valve adapted to let out air from the teat volume to the container volume.

5. The baby bottle device according to claim 1, further comprising a flexible element coupled to the partitioning element and/or the floater.

6. The baby bottle device according to claim 5, wherein the flexible element serves to seal or cover at least part of the at least one opening in the partitioning element.

7. The baby bottle device according to claim 5, wherein the flexible element acts as a valve to let out air from the teat volume.

8. The baby bottle device according to claim 1, wherein a cross section of the floater is smaller than a cross section of the partitioning element.

9. A partitioning system for a baby bottle device, the baby bottle device comprising a container having a container volume, and a teat having a teat volume, wherein the partitioning system comprises:

a partitioning element for mounting at an open end of the container between the teat volume and the container volume, having a plurality of openings for letting fluid in the container volume flow into the teat volume; and a floater having a buoyancy, and being coupled to the partitioning element, wherein the floater is adapted to float in a liquid in the container volume when liquid is present at the open end of the container, wherein, when floating, the floater is adapted to: close at least one opening of the partitioning element, which is located at a vertically upper region of the partitioning element, due to the buoyancy of the floater causing the floater to float to said vertically upper region of the partitioning element; and, at the same time, open at least one opening of the partitioning element which is located at a vertically lower region of the partitioning element.

10. A teat assembly comprising:

the partitioning system of claim 9; and the teat.

11. The partitioning system according to claim 9, further comprising an adapter for coupling the teat to the container.

12. The partitioning system according to claim 9, wherein the floater comprises a hollow chamber filled with air in order to provide a required buoyancy or is made of a material which has a lower density than milk to enable it to float on milk.

13. The partitioning system according to claim 9, further comprising at least one valve adapted to let out air from the teat volume to the container volume.

14. The partitioning system according to claim 9, further comprising a flexible element coupled to the partitioning element and/or the floater.

15. The partitioning system according to claim 14, wherein the flexible element serves to seal or cover at least part of the at least one opening in the partitioning element.

16. The partitioning system according to claim 14, wherein the flexible element acts as a valve to let out air from the teat volume.

17. The partitioning system according to claim 9, wherein a cross section of the floater is smaller than a cross section of the partitioning element.

* * * * *